(12) United States Patent
Fang et al.

(10) Patent No.: US 12,027,996 B2
(45) Date of Patent: Jul. 2, 2024

(54) FRACTAL POWER CONVERTER AND METHOD FOR CONSTRUCTING FRACTAL POWER CONVERTER

(71) Applicant: SHANDONG UNIVERSITY, Shandong (CN)

(72) Inventors: Jingyang Fang, Jinan (CN); Hongchang Li, Jinan (CN); Feng Gao, Jinan (CN); Xu Yang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/273,155

(22) PCT Filed: Jan. 17, 2023

(86) PCT No.: PCT/CN2023/072643
§ 371 (c)(1),
(2) Date: Jul. 19, 2023

(87) PCT Pub. No.: WO2023/093918
PCT Pub. Date: Jun. 1, 2023

(65) Prior Publication Data
US 2024/0088801 A1 Mar. 14, 2024

(30) Foreign Application Priority Data
Nov. 24, 2021 (CN) .......................... 202111407007.1

(51) Int. Cl.
*H02M 7/5387* (2007.01)
*H02J 3/32* (2006.01)
(Continued)

(52) U.S. Cl.
CPC ........... *H02M 7/53871* (2013.01); *H02J 3/32* (2013.01); *H02J 3/36* (2013.01); *H02M 7/5388* (2013.01)

(58) Field of Classification Search
CPC ........... H02M 7/53871; H02M 7/5388; H02M 7/4835; H02M 7/49; H02M 7/5387;
(Continued)

(56) References Cited

U.S. PATENT DOCUMENTS 9,807,863 B1 * 10/2017 Van Zyl .................... H05H 1/46
2012/0112545 A1 * 5/2012 Aiello .................. H02M 7/4837
307/64

(Continued)

FOREIGN PATENT DOCUMENTS

CN 105429153 A 3/2016
CN 205249074 U 5/2016
(Continued)

OTHER PUBLICATIONS

Jul. 17, 2023 Office Action issued in Chinese Patent Application No. 202111407007.1.

(Continued)

*Primary Examiner* — Yusef A Ahmed
(74) *Attorney, Agent, or Firm* — Oliff PLC

(57) ABSTRACT

A fractal power converter and a method for constructing the fractal power converter, the method for constructing the fractal converter including: replacing a switch and/or an energy storage element of an asymmetric half-bridge sub-module with the same asymmetric half-bridge sub-module for at least two times, replacing a switch and/or an energy storage element of a symmetric half-bridge sub-module with the same symmetric half-bridge sub-module for at least two times, and replacing a switch and/or an energy storage element of an H-bridge sub-module with the same H-bridge sub-module for at least two times. Compared with a conventional high-voltage and large-current power converter, the fractal power converter may output any high-voltage and large-current waveform. The system is modularized, the (Continued)

structure is simple and extensible, and voltage and current may be evenly distributed among the modules. The control method is simple and easy to standardize. Multi-port parallel output is allowed.

6 Claims, 11 Drawing Sheets

(51) Int. Cl.
  *H02J 3/36* (2006.01)
  *H02M 7/5388* (2007.01)
(58) Field of Classification Search
  CPC .... H02M 1/088; H02J 3/32; H02J 3/36; H02J 3/322; H02J 3/38; H02J 7/345; H02J 2300/24; H02J 2300/28; Y02B 70/10; Y02E 10/56; Y02E 60/60
  See application file for complete search history.

(56) References Cited

U.S. PATENT DOCUMENTS

| | | | | |
|---|---|---|---|---|
| 2016/0141963 | A1* | 5/2016 | Bakran | H02M 3/156 363/21.01 |
| 2016/0336872 | A1* | 11/2016 | Cheng | H02M 7/487 |
| 2016/0368392 | A1* | 12/2016 | Braun | B60L 53/20 |
| 2019/0052187 | A1* | 2/2019 | Geske | H02M 1/32 |
| 2020/0044555 | A1* | 2/2020 | Ying | H02M 7/4835 |
| 2021/0152099 | A1* | 5/2021 | Oh | H02M 7/4835 |
| 2022/0352823 | A1* | 11/2022 | Frost | H02M 1/0845 |
| 2023/0024492 | A1* | 1/2023 | Arazm | H02M 7/5387 |
| 2023/0163675 | A1* | 5/2023 | Zhang | H02J 3/381 307/82 |

FOREIGN PATENT DOCUMENTS

| | | |
|---|---|---|
| CN | 106953530 A | 7/2017 |
| CN | 206602450 U | 10/2017 |
| CN | 108702105 A | 10/2018 |
| CN | 109039046 A | 12/2018 |
| CN | 109391161 A | 2/2019 |
| CN | 112615547 A | 4/2021 |
| CN | 114094867 A | 2/2022 |
| DE | 102019006476 A1 | 3/2021 |
| SE | 1650845 A1 | 11/2017 |
| WO | 2014005634 A1 | 1/2014 |
| WO | 2015/110185 A1 | 7/2015 |

OTHER PUBLICATIONS

Oct. 17, 2023 Notice of Allowance issued in Chinese Patent Application No. 202111407007.1.
Jul. 17, 2023 Search Report issued in Chinese Patent Application No. 202111407007.1.
May 26, 2023 Search Report issued in International Patent Application No. PCT/CN2023/072643.
May 26, 2023 Written Opinion of the ISA issued in International Patent Application No. PCT/CN2023/072643.

* cited by examiner

FRACTAL POWER CONVERTER AND METHOD FOR CONSTRUCTING FRACTAL POWER CONVERTER

CROSS-REFERENCE TO RELATED APPLICATIONS

The present invention claims priority to Chinese Patent Application No. 202111407007.1, filed to the China National Intellectual Property Administration on Nov. 24, 2021, entitled "FRACTAL POWER CONVERTER AND METHOD FOR CONSTRUCTING FRACTAL POWER CONVERTER", the entire contents of which are incorporated herein by reference.

TECHNICAL FIELD

The present invention belongs to the technical field of power electronics, and in particular, to a fractal power converter and a method for constructing the fractal power converter.

BACKGROUND

The statements in this section merely provide background information related to the present invention and do not necessarily constitute the prior art.

Applications such as large-power wind-solar storage renewable energy grid-connected power generation systems, high-voltage AC/DC transmission, medium-voltage electric drive, medium/high-voltage power quality purification devices, solid-state transformers, electric vehicle charging piles, power amplifiers, pulse plasma power supplies, special medical equipment power supplies, and electromagnetic gun power supplies are required to generate voltage/current waveforms with high voltage, large current, high power, and arbitrary controllable shape in a very short time.

Existing multilevel converters, such as cascaded bridge converters and modular multilevel converters, may share voltage among modules through series connection, but cannot distribute current evenly. Existing multi-parallel converters, such as multiple parallel photovoltaic inverters, may share currents among modules through parallel connection, but cannot bear high voltage. Existing high-voltage and large-current power supplies mostly use inductance-capacitance resonance to generate voltage/current waveforms with required frequency, but the waveform quality is closely related to circuit parameters, such as series resistance, and cannot be controlled arbitrarily. Energy cannot be recycled, resulting in large system cost, volume, and loss.

In addition, the existing high-voltage and large-current power converters are designed for specific applications. An overall circuit of a system is not modular, which is not extensible as a modular system. The controller design depends on the power level of the system, which is difficult to be universal and standardized. Usually, the system only has a single output port and does not have a multi-port parallel output function.

SUMMARY

In order to solve the foregoing problems, the present invention provides a fractal power converter and a method for constructing the fractal power converter. The present invention provides a method for constructing a fractal converter by utilizing a fractal theory, and provides a total of nine fractal converters based on the proposed method and three common sub-modules (including asymmetric half-bridge sub-modules, symmetric half-bridge sub-modules, and H-bridge sub-modules). Compared with a conventional high-voltage and large-current power converter, the fractal power converter may output any high-voltage and large-current waveform. The system is modularized, the structure is simple and extensible, and voltage and current may be evenly distributed among the modules. The control method is simple and easy to standardize. Multi-port parallel output is allowed.

According to some embodiments, the present invention adopts the following technical solutions:

In a First Aspect, the Present Invention Provides a Method for Constructing a Fractal Converter.

The method for constructing the fractal converter includes:

replacing a switch and/or an energy storage element of an asymmetric half-bridge sub-module with the same asymmetric half-bridge sub-module for at least two times.

In a Second Aspect, the Present Invention Provides a Fractal Converter.

The fractal converter is constructed by replacing, using the method for constructing the fractal converter described in the first aspect, a switch of an asymmetric half-bridge sub-module with an asymmetric half-bridge sub-module for at least two times.

The fractal converter includes: at least four asymmetric half-bridge sub-modules, at least three energy storage elements, and at least two output terminals.

The first energy storage element is arranged between a first port of the first asymmetric half-bridge sub-module and a second port of the second asymmetric half-bridge sub-module. The second energy storage element is arranged between a first port of the third asymmetric half-bridge sub-module and a second port of the fourth asymmetric half-bridge sub-module. The third energy storage element is arranged between a second port of the first asymmetric half-bridge sub-module and the second port of the fourth asymmetric half-bridge sub-module.

The second port of the first asymmetric half-bridge sub-module is connected to a first port of the second asymmetric half-bridge sub-module. The second port of the second asymmetric half-bridge sub-module is connected to a second port of the third asymmetric half-bridge sub-module. The second port of the third asymmetric half-bridge sub-module is connected to a first port of the fourth asymmetric half-bridge sub-module.

The first output terminal is the second port of the second asymmetric half-bridge sub-module. The second output terminal is the second port of the fourth asymmetric half-bridge sub-module.

In a Third Aspect, the Present Invention Provides a Fractal Converter.

The fractal converter is constructed by replacing, using the method for constructing the fractal converter described in the first aspect, an energy storage element of an asymmetric half-bridge sub-module with an asymmetric half-bridge sub-module for at least two times.

The fractal converter includes at least one asymmetric half-bridge sub-module, at least four switches, and at least two output terminals.

A first port of the asymmetric half-bridge sub-module is connected to a first port of the first switch. A second port of the first switch is connected to a first port of the second switch and a first port of the third switch respectively. A second port of the third switch is connected to a first port of the fourth switch. A second port of the fourth switch and a second port of the second switch are both connected to a second port of the asymmetric half-bridge sub-module.

The first output terminal is the second port of the third switch. The second output terminal is the second port of the fourth switch.

In a Fourth Aspect, the Present Invention Provides a Fractal Converter.

The fractal converter is constructed by replacing, using the method for constructing the fractal converter described in the first aspect, a switch and an energy storage element of an asymmetric half-bridge sub-module with an asymmetric half-bridge sub-module for at least nine times.

The fractal converter includes at least nine asymmetric half-bridge sub-modules and at least two output terminals.

A first port of the first asymmetric half-bridge sub-module is connected to a first port of the second asymmetric half-bridge sub-module. A second port of the second asymmetric half-bridge sub-module is connected to a first port of the third asymmetric half-bridge sub-module. A second port of the third asymmetric half-bridge sub-module is connected to a second port of the first asymmetric half-bridge sub-module.

A first port of the fourth asymmetric half-bridge sub-module is connected to a first port of the fifth asymmetric half-bridge sub-module. A second port of the fifth asymmetric half-bridge sub-module is connected to a first port of the sixth asymmetric half-bridge sub-module. A second port of the sixth asymmetric half-bridge sub-module is connected to a second port of the fourth asymmetric half-bridge sub-module.

A first port of the seventh asymmetric half-bridge sub-module is connected to a first port of the eighth asymmetric half-bridge sub-module. A second port of the eighth asymmetric half-bridge sub-module is connected to a first port of the ninth asymmetric half-bridge sub-module. A second port of the ninth asymmetric half-bridge sub-module is connected to a second port of the seventh asymmetric half-bridge sub-module.

The second port of the second asymmetric half-bridge sub-module is connected to the second port of the fifth asymmetric half-bridge sub-module.

The second port of the first asymmetric half-bridge sub-module is connected to the second port of the ninth asymmetric half-bridge sub-module.

The second port of the sixth asymmetric half-bridge sub-module is connected to the second port of the eighth asymmetric half-bridge sub-module.

The first output terminal is the second port of the sixth asymmetric half-bridge sub-module. The second output terminal is the second port of the ninth asymmetric half-bridge sub-module.

In a Fifth Aspect, the Present Invention Provides a Method for Constructing a Fractal Converter.

The method for constructing the fractal converter includes:

replacing a switch and/or an energy storage element of a symmetric half-bridge sub-module with the same symmetric half-bridge sub-module for at least two times.

In a Sixth Aspect, the Present Invention Provides a Fractal Converter.

The fractal converter is constructed by replacing, using the method for constructing the fractal converter described in the fifth aspect, a switch of a symmetric half-bridge sub-module with a symmetric half-bridge sub-module for at least two times.

The fractal converter includes at least four symmetric half-bridge sub-modules, at least six energy storage elements, and at least two output terminals.

The first energy storage element is arranged between a first port of the first symmetric half-bridge sub-module and a second port of the third symmetric half-bridge sub-module. The second energy storage element is arranged between a second port of the second symmetric half-bridge sub-module and the second port of the third symmetric half-bridge sub-module. A first port of the second symmetric half-bridge sub-module is connected to a first port of the third symmetric half-bridge sub-module after being sequentially connected to the fifth energy storage element, the sixth energy storage element, and the third energy storage element. The first port of the third symmetric half-bridge sub-module is connected to a second port of the fourth symmetric half-bridge sub-module after being sequentially connected to the third energy storage element and the fourth energy storage element. A second port of the first symmetric half-bridge sub-module is connected to a first port of the second symmetric half-bridge sub-module. The second port of the third symmetric half-bridge sub-module is connected to a first port of the fourth symmetric half-bridge sub-module.

The first output terminal is the second port of the third symmetric half-bridge sub-module. The second output terminal is arranged between the fifth energy storage element and the sixth energy storage element.

In a Seventh Aspect, the Present Invention Provides a Fractal Converter.

The fractal converter is constructed by replacing, using the method for constructing the fractal converter described in the fifth aspect, an energy storage element of a symmetric half-bridge sub-module with a symmetric half-bridge sub-module for at least two times.

The fractal converter includes at least four symmetric half-bridge sub-modules, at least six switches, and at least two output terminals.

A second port of the first symmetric half-bridge sub-module is connected to a first port of the second symmetric half-bridge sub-module. A second port of the third symmetric half-bridge sub-module is connected to a first port of the fourth symmetric half-bridge sub-module.

A first port of the first symmetric half-bridge sub-module is connected to a first port of the first switch. A second port of the first switch is connected to a first port of the second switch and a first port of the fifth switch respectively. A second port of the second switch is connected to a second port of the second symmetric half-bridge sub-module. A second port of the fifth switch is connected to a first port of the sixth switch. A second port of the sixth switch is connected to a first port of the fourth symmetric half-bridge sub-module. A first port of the third switch is connected to a first port of the third symmetric half-bridge sub-module. A second port of the third switch is connected to a first port of the fourth switch. A second port of the fourth switch is connected to a second port of the fourth symmetric half-bridge sub-module. A second port of the first symmetric half-bridge sub-module is connected to the second port of the third switch.

The first output terminal is a second port of a fifth energy storage element. The second output terminal is the second port of the first symmetric half-bridge sub-module.

In an Eighth Aspect, the Present Invention Provides a Fractal Converter.

The fractal converter is constructed by replacing, using the method for constructing the fractal converter described in the fifth aspect, a switch and an energy storage element of a symmetric half-bridge sub-module with a symmetric half-bridge sub-module for at least two times.

The fractal converter includes at least sixteen asymmetric half-bridge sub-modules 102 and at least two output terminals.

A first port of the first symmetric half-bridge sub-module is connected to a first port of the second symmetric half-bridge sub-module. A second port of the second symmetric half-bridge sub-module is connected to a first port of the fourth symmetric half-bridge sub-module. A second port of the fourth symmetric half-bridge sub-module is connected to a second port of the third symmetric half-bridge sub-module. A first port of the third symmetric half-bridge sub-module is connected to a second port of the first symmetric half-bridge sub-module.

A first port of the fifth symmetric half-bridge sub-module is connected to a first port of the sixth symmetric half-bridge sub-module. A second port of the sixth symmetric half-bridge sub-module is connected to a first port of the eighth symmetric half-bridge sub-module. A second port of the eighth symmetric half-bridge sub-module is connected to a second port of the seventh symmetric half-bridge sub-module. A first port of the seventh symmetric half-bridge sub-module is connected to the second port of the sixth symmetric half-bridge sub-module.

A first port of the ninth symmetric half-bridge sub-module is connected to a first port of the tenth symmetric half-bridge sub-module. A second port of the tenth symmetric half-bridge sub-module is connected to a first port of the twelfth symmetric half-bridge sub-module. A second port of the twelfth symmetric half-bridge sub-module is connected to a second port of the eleventh symmetric half-bridge sub-module. A first port of the eleventh symmetric half-bridge sub-module is connected to a second port of the tenth symmetric half-bridge sub-module.

A first port of the thirteenth symmetric half-bridge sub-module is connected to a first port of the fourteenth symmetric half-bridge sub-module. A second port of the fourteenth symmetric half-bridge sub-module is connected to a first port of the sixteenth symmetric half-bridge sub-module. A second port of the sixteenth symmetric half-bridge sub-module is connected to a second port of the fifteenth symmetric half-bridge sub-module. A first port of the fifteenth symmetric half-bridge sub-module is connected to a second port of the fourteenth symmetric half-bridge sub-module.

The second port of the first symmetric half-bridge sub-module is connected to a second port of the ninth symmetric half-bridge sub-module. The second port of the second symmetric half-bridge sub-module is connected to a second port of the fifth symmetric half-bridge sub-module. The second port of the sixth symmetric half-bridge sub-module is connected to the second port of the fourteenth symmetric half-bridge sub-module. The second port of the tenth symmetric half-bridge sub-module is connected to a second port of the thirteenth symmetric half-bridge sub-module.

The first output terminal is the second port of the sixth symmetric half-bridge sub-module. The second output terminal is the second port of the first symmetric half-bridge sub-module.

In a Ninth Aspect, the Present Invention Provides a Method for Constructing a Fractal Converter.

The method for constructing the fractal converter includes:

replacing a switch and/or an energy storage element of an H-bridge sub-module with the same H-bridge sub-module for at least two times.

In a Tenth Aspect, the Present Invention Provides a Fractal Converter.

The fractal converter is constructed by replacing, using the method for constructing the fractal converter described in the ninth aspect, a switch of an H-bridge sub-module with an H-bridge sub-module for at least two times.

The fractal converter includes at least sixteen H-bridge sub-modules, at least five energy storage elements, and at least two output terminals.

A first port of the first H-bridge sub-module is connected to a second port of the second H-bridge sub-module. A first port of the second H-bridge sub-module is connected to a first port of the fourth H-bridge sub-module. A second port of the fourth H-bridge sub-module is connected to a first port of the third H-bridge sub-module. A second port of the third H-bridge sub-module is connected to a second port of the first H-bridge sub-module. The first energy storage element is arranged between the first port of the first H-bridge sub-module and the second port of the fourth H-bridge sub-module.

A first port of the fifth H-bridge sub-module is connected to a second port of the sixth H-bridge sub-module. A first port of the sixth H-bridge sub-module is connected to a first port of the eighth H-bridge sub-module. A second port of the eighth H-bridge sub-module is connected to a first port of the seventh H-bridge sub-module. A second port of the seventh H-bridge sub-module is connected to a second port of the fifth H-bridge sub-module. The second energy storage element is arranged between the first port of the fifth H-bridge sub-module and the second port of the eighth H-bridge sub-module.

A first port of the ninth H-bridge sub-module is connected to a second port of the tenth H-bridge sub-module. A first port of the tenth H-bridge sub-module is connected to a first port of the twelfth H-bridge sub-module. A second port of the twelfth H-bridge sub-module is connected to a first port of the eleventh H-bridge sub-module. A second port of the eleventh H-bridge sub-module is connected to a second port of the ninth H-bridge sub-module. The third energy storage element is arranged between the first port of the ninth H-bridge sub-module and the second port of the twelfth H-bridge sub-module.

A first port of the thirteenth H-bridge sub-module is connected to a second port of the fourteenth H-bridge sub-module. A first port of the fourteenth H-bridge sub-module is connected to a first port of the sixteenth H-bridge sub-module. A second port of the sixteenth H-bridge sub-module is connected to a first port of the fifteenth H-bridge sub-module. A second port of the fifteenth H-bridge sub-module is connected to a second port of the thirteenth H-bridge sub-module. The fourth energy storage element is arranged between the first port of the thirteenth H-bridge sub-module and the second port of the sixteenth H-bridge sub-module.

The second port of the first H-bridge sub-module is connected to the second port of the fifth H-bridge sub-module. The first port of the second H-bridge sub-module is connected to the second port of the ninth H-bridge sub-module. The first port of the sixth H-bridge sub-module is connected to the second port of the thirteenth H-bridge sub-module. The first port of the tenth H-bridge sub-module is connected to the first port of the fourteenth H-bridge sub-module.

The fifth energy storage element is arranged between the first port of the second H-bridge sub-module and the second port of the fifteenth H-bridge sub-module.

The first output terminal is the second port of the first H-bridge sub-module. The second output terminal is the first port of the tenth H-bridge sub-module.

In an Eleventh Aspect, the Present Invention Provides a Fractal Converter.

The fractal converter is constructed by replacing, using the method for constructing the fractal converter described in the ninth aspect, an energy storage element of an H-bridge sub-module with an H-bridge sub-module for at least two times.

The fractal converter includes at least one H-bridge sub-module, at least eight switches, and at least two output terminals.

A first port of the first switch is connected to a first port of the third switch. A second port of the third switch is connected to a first port of the fourth switch. A second port of the fourth switch is connected to a second port of the second switch. A first port of the second switch is connected to a second port of the first switch.

A first port of the H-bridge sub-module is connected to the first port of the first switch. A second port of the H-bridge sub-module is connected to the second port of the fourth switch.

A first port of the fifth switch is connected to a first port of the seventh switch. A second port of the seventh switch is connected to a first port of the eighth switch. A second port of the eighth switch is connected to a second port of the sixth switch. A first port of the sixth switch is connected to a second port of the fifth switch.

The first port of the fifth switch is connected to the second port of the first switch. The first port of the fourth switch is connected to the second port of the eighth switch.

The first output terminal is the second port of the fifth switch. The second output terminal is the second port of the seventh switch.

In a Twelfth Aspect, the Present Invention Provides a Fractal Converter.

The fractal converter is constructed by replacing, using the method for constructing the fractal converter described in the ninth aspect, a switch and an energy storage element of an H-bridge sub-module with an H-bridge sub-module for at least two times.

The fractal converter includes at least twenty-five H-bridge sub-modules and at least four output terminals.

A first port of the first H-bridge sub-module is connected to a second port of the second H-bridge sub-module and a first port of the third H-bridge sub-module respectively. A first port of the second H-bridge sub-module is connected to a first port of the fifth H-bridge sub-module. A second port of the fifth H-bridge sub-module is connected to a second port of the third H-bridge sub-module and a first port of the fourth H-bridge sub-module respectively. A second port of the fourth H-bridge sub-module is connected to a second port of the first H-bridge sub-module.

A first port of the sixth H-bridge sub-module is connected to a second port of the seventh H-bridge sub-module and a first port of the eighth H-bridge sub-module respectively. A first port of the seventh H-bridge sub-module is connected to a first port of the tenth H-bridge sub-module. A second port of the tenth H-bridge sub-module is connected to a second port of the eighth H-bridge sub-module and a first port of the ninth H-bridge sub-module respectively. A second port of the ninth H-bridge sub-module is connected to a second port of the sixth H-bridge sub-module.

A first port of the eleventh H-bridge sub-module is connected to a second port of the twelfth H-bridge sub-module and a first port of the thirteenth H-bridge sub-module respectively. A first port of the twelfth H-bridge sub-module is connected to a first port of the fifteenth H-bridge sub-module. A second port of the fifteenth H-bridge sub-module is connected to a second port of the thirteenth H-bridge sub-module and a first port of the fourteenth H-bridge sub-module respectively. A second port of the fourteenth H-bridge sub-module is connected to a second port of the eleventh H-bridge sub-module.

A first port of the sixteenth H-bridge sub-module is connected to a second port of the seventeenth H-bridge sub-module and a first port of the eighteenth H-bridge sub-module respectively. A first port of the seventeenth H-bridge sub-module is connected to a first port of the twentieth H-bridge sub-module. A second port of the twentieth H-bridge sub-module is connected to a second port of the eighteenth H-bridge sub-module and a first port of the nineteenth H-bridge sub-module respectively. A second port of the nineteenth H-bridge sub-module is connected to a second port of the sixteenth H-bridge sub-module.

A first port of the twenty-first H-bridge sub-module is connected to a second port of the twenty-second H-bridge sub-module and a first port of the twenty-third H-bridge sub-module respectively. A first port of the twenty-second H-bridge sub-module is connected to a first port of the twenty-fifth H-bridge sub-module. A second port of the twenty-fifth H-bridge sub-module is connected to a second port of the twenty-third H-bridge sub-module and a first port of the twenty-fourth H-bridge sub-module respectively. A second port of the twenty-fourth H-bridge sub-module is connected to a second port of the twenty-first H-bridge sub-module.

The second port of the first H-bridge sub-module is connected to the second port of the sixteenth H-bridge sub-module. The first port of the second H-bridge sub-module is connected to the second port of the twelfth H-bridge sub-module. The first port of the fourteenth H-bridge sub-module is connected to the second port of the twenty-fourth H-bridge sub-module. The first port of the seventh H-bridge sub-module is connected to the first port of the twenty-fifth H-bridge sub-module.

The first output terminal is the first port of the seventh H-bridge sub-module. The second output terminal is the second port of the first H-bridge sub-module. The third output terminal is the first port of the second H-bridge sub-module. The fourth output terminal is the first port of the seventeenth H-bridge sub-module.

Compared with the prior art, the present invention has the following beneficial effects:

Compared with a conventional high-voltage and large-current power converter, the fractal power converter may output any high-voltage and large-current DC or AC waveform repeatedly or once. The system is simple in structure and extensible, and voltage and current may be evenly distributed among the modules. The control method is simple and easy to standardize. Multi-port parallel output is allowed.

BRIEF DESCRIPTION OF THE DRAWINGS

The accompanying drawings, which constitute a part of the present invention, serve to provide a further understanding of the present invention. Schematic embodiments of the present invention and the descriptions thereof serve to explain the present invention and are not to be construed as unduly limiting the present invention.

DETAILED DESCRIPTION

The present invention will be further described with reference to the accompanying drawings and embodiments.

It is to be noted that the following detailed description is exemplary and is intended to provide a further explanation of the present invention. Unless otherwise specified, all technical and scientific terms used in the present invention have the same meaning as commonly understood by a person of ordinary skill in the art to which the present invention belongs.

It is to be noted that the terms used herein are for the purpose of describing specific implementations only and are not intended to be limiting of exemplary implementations according to the present invention. As used herein, the singular form is intended to include the plural form unless the context clearly dictates otherwise. In addition, it is to be understood that the term "including", when used in the present specification, specifies the presence of features, steps, operations, devices, components, and/or combinations thereof.

In the present invention, the terms such as "connected" and "connection" are to be understood broadly, which may be fixed connection, may be integrated connection or detachable connection, may be directly connected, or may be indirectly connected through an intermediary. The specific meanings of the foregoing terms in the present invention may be determined according to the specific circumstances of the relevant scientific research or technical personnel in the art and cannot be understood as limiting to the present invention.

Embodiment 1

This Embodiment Provides a Method for Constructing a Fractal Converter.

The method for constructing the fractal converter includes:

replacing switches 111, 112 and/or an energy storage element 113 of an asymmetric half-bridge sub-module 101 with the same asymmetric half-bridge sub-module 101 for at least two times.

Figure 1A:
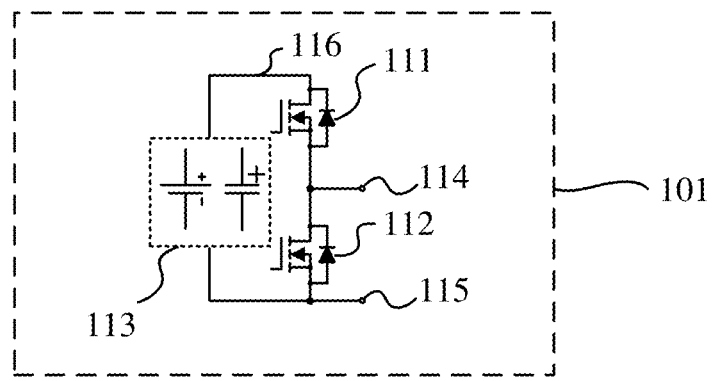
FIG. 1a is a structural diagram of a conventional asymmetric half-bridge sub-module.

As shown in FIG. 1a, the asymmetric half-bridge sub-module 101 includes at least two switches and at least one energy storage element. A first port of the first switch 111 is connected to one end of the energy storage element 113. The other end of the energy storage element 113 is connected to a second port of the second switch 112. A first port of the second switch 112 is connected to a second port of the first switch 111.

Optionally, the switches are selected from a group consisting of IGBT, MOSFET, SiC or GaN power switch devices.

Optionally, the energy storage element is selected from a group consisting of a capacitor, a super-capacitor, a lithium battery pack, a lead-acid storage battery pack, or a sodium-sulfur battery pack.

Embodiment 2

This Embodiment Provides a Fractal Converter.

The fractal converter is an asymmetric half-bridge switching fractal converter 201, which is constructed by replacing, using the method for constructing the fractal converter described in Embodiment 1, a switch of an asymmetric half-bridge sub-module with an asymmetric half-bridge sub-module for at least two times.

Figure 2A:
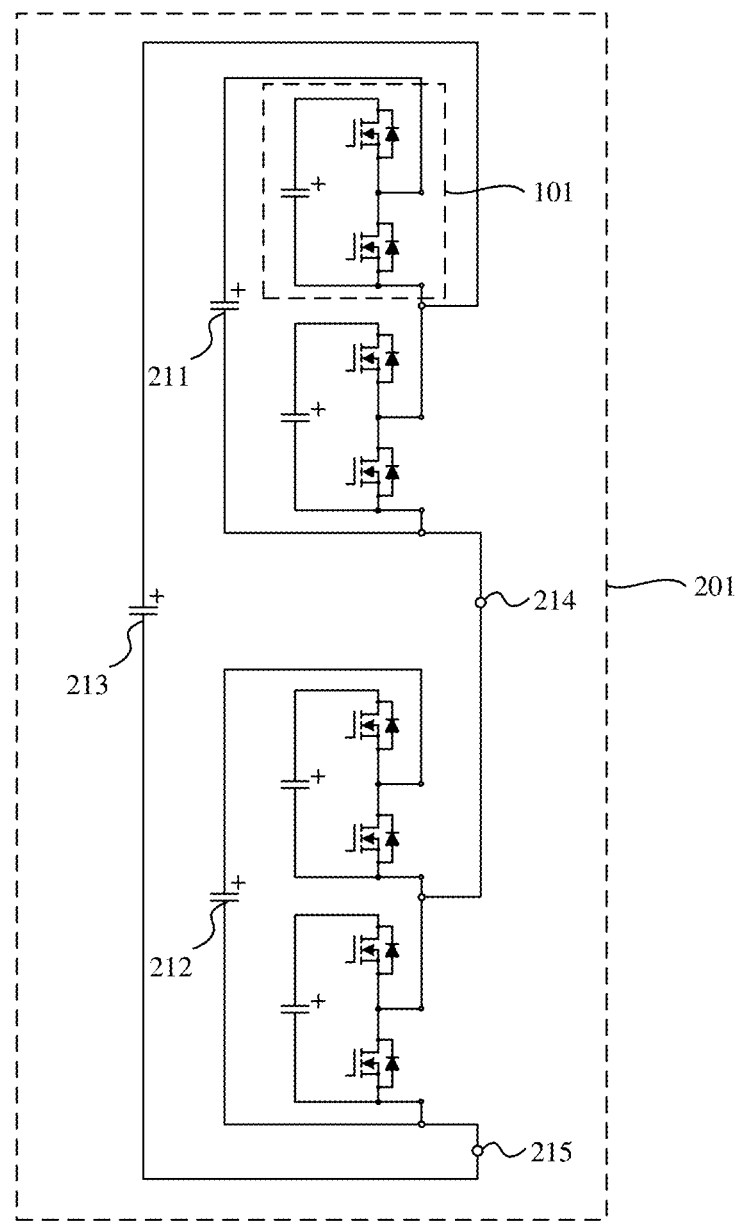
FIG. 2a is a structural diagram of an asymmetric half-bridge switching fractal converter implemented by the present invention.

The fractal converter includes: at least four asymmetric half-bridge sub-modules 101, at least three energy storage elements 211, 212, 213, and at least two output terminals 214, 215, as shown in FIG. 2a.

The first energy storage element 211 is arranged between a first port of the first asymmetric half-bridge sub-module and a second port of the second asymmetric half-bridge sub-module. The second energy storage element 212 is arranged between a first port of the third asymmetric half-bridge sub-module and a second port of the fourth asymmetric half-bridge sub-module. The third energy storage element 213 is arranged between a second port of the first asymmetric half-bridge sub-module and the second port of the fourth asymmetric half-bridge sub-module.

The second port of the first asymmetric half-bridge sub-module is connected to a first port of the second asymmetric half-bridge sub-module. The second port of the second asymmetric half-bridge sub-module is connected to a second port of the third asymmetric half-bridge sub-module. The second port of the third asymmetric half-bridge sub-module is connected to a first port of the fourth asymmetric half-bridge sub-module.

The first output terminal 214 is the second port of the second asymmetric half-bridge sub-module. The second output terminal 215 is the second port of the fourth asymmetric half-bridge sub-module.

As shown in FIG. 1a, the asymmetric half-bridge sub-module 101 includes at least two switches and at least one energy storage element. A first port of the first switch 111 is connected to one end of the energy storage element 113. The other end of the energy storage element 113 is connected to a second port of the second switch 112. A first port of the second switch 112 is connected to a second port of the first switch 111.

Optionally, the switches are selected from a group consisting of IGBT, MOSFET, SiC or GaN power switch devices.

Optionally, the energy storage element is selected from a group consisting of a capacitor, a super-capacitor, a lithium battery pack, a lead-acid storage battery pack, or a sodium-sulfur battery pack.

Embodiment 3

This Embodiment Provides a Fractal Converter.

The fractal converter is an asymmetric half-bridge energy storage fractal converter 301, which is constructed by replacing, using the method for constructing the fractal converter described in Embodiment 1, an energy storage element of an asymmetric half-bridge sub-module with an asymmetric half-bridge sub-module for at least two times.

Figure 3A:
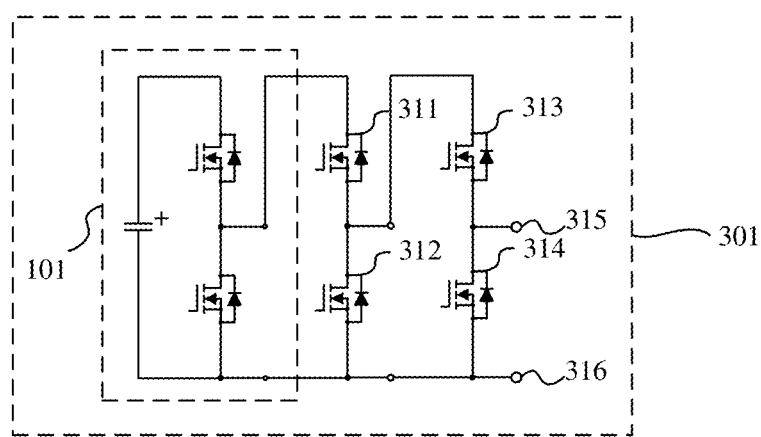
FIG. 3a is a structural diagram of an asymmetric half-bridge energy storage fractal converter implemented by the present invention.

The fractal converter includes at least one asymmetric half-bridge sub-module 101, at least four switches 311, 312, 313, 314, and at least two output terminals 315, 316, as shown in FIG. 3a.

A first port of the asymmetric half-bridge sub-module is connected to a first port of the first switch 311. A second port of the first switch 311 is connected to a first port of the second switch 312 and a first port of the third switch 313 respectively. A second port of the third switch 313 is connected to a first port of the fourth switch 314. A second port of the fourth switch 314 and a second port of the second switch 312 are both connected to a second port of the asymmetric half-bridge sub-module.

The first output terminal 315 is the second port of the third switch. The second output terminal 316 is the second port of the fourth switch.

As shown in FIG. 1a, the asymmetric half-bridge sub-module 101 includes at least two switches and at least one energy storage element. A first port of the first switch 111 is connected to one end of the energy storage element 113. The other end of the energy storage element 113 is connected to a second port of the second switch 112. A first port of the second switch 112 is connected to a second port of the first switch 111.

Optionally, the switches are selected from a group consisting of IGBT, MOSFET, SiC or GaN power switch devices.

Optionally, the energy storage element is selected from a group consisting of a capacitor, a super-capacitor, a lithium battery pack, a lead-acid storage battery pack, or a sodium-sulfur battery pack.

Embodiment 4

This Embodiment Provides a Fractal Converter.

The fractal converter is an asymmetric half-bridge switching and energy storage fractal converter 401, which is constructed by replacing, using the method for constructing the fractal converter described in Embodiment 1, a switch and an energy storage element of an asymmetric half-bridge sub-module with an asymmetric half-bridge sub-module for at least two times.

Figure 4A:
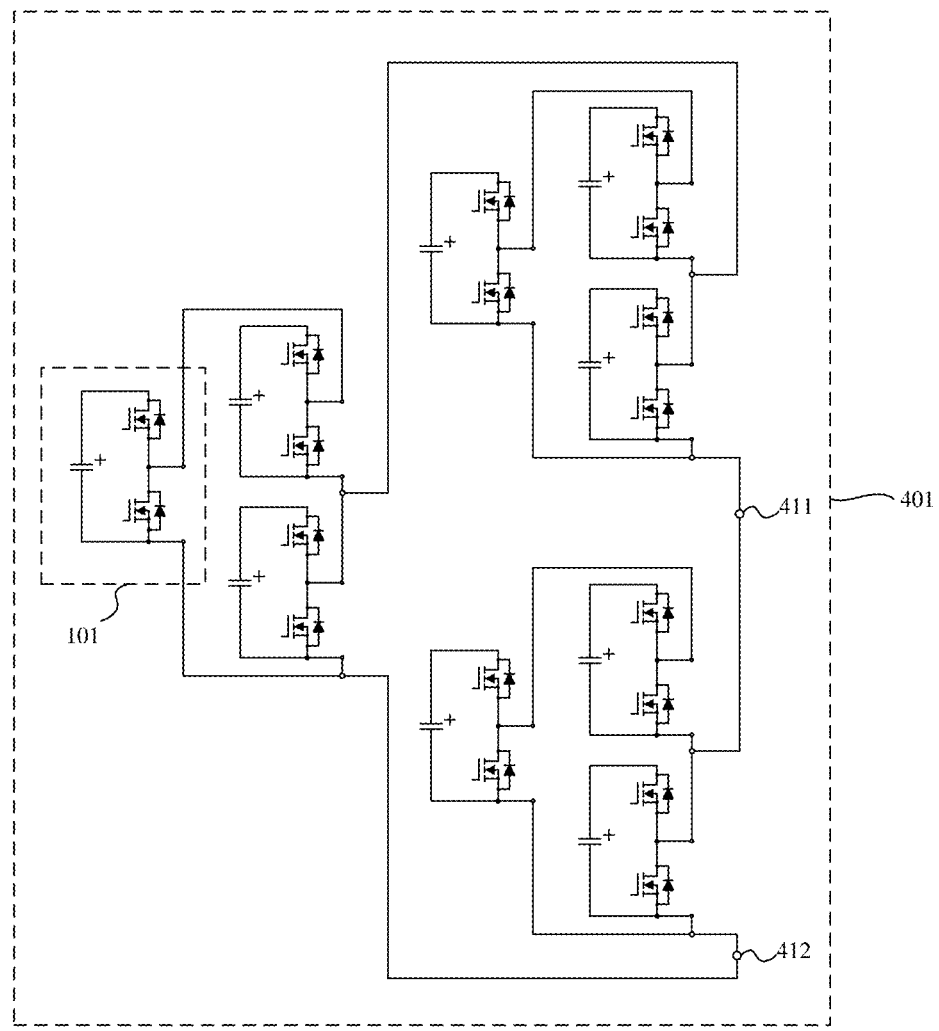
FIG. 4a is a structural diagram of an asymmetric half-bridge switching and energy storage fractal converter implemented by the present invention.

The fractal converter includes at least nine asymmetric half-bridge sub-modules 101 and at least two output terminals 411, 412, as shown in FIG. 4a.

A first port of the first asymmetric half-bridge sub-module is connected to a first port of the second asymmetric half-bridge sub-module. A second port of the second asymmetric half-bridge sub-module is connected to a first port of the third asymmetric half-bridge sub-module. A second port of the third asymmetric half-bridge sub-module is connected to a second port of the first asymmetric half-bridge sub-module.

A first port of the fourth asymmetric half-bridge sub-module is connected to a first port of the fifth asymmetric half-bridge sub-module. A second port of the fifth asymmetric half-bridge sub-module is connected to a first port of the sixth asymmetric half-bridge sub-module. A second port of the sixth asymmetric half-bridge sub-module is connected to a second port of the fourth asymmetric half-bridge sub-module.

A first port of the seventh asymmetric half-bridge sub-module is connected to a first port of the eighth asymmetric half-bridge sub-module. A second port of the eighth asymmetric half-bridge sub-module is connected to a first port of the ninth asymmetric half-bridge sub-module. A second port of the ninth asymmetric half-bridge sub-module is connected to a second port of the seventh asymmetric half-bridge sub-module.

The second port of the second asymmetric half-bridge sub-module is connected to the second port of the fifth asymmetric half-bridge sub-module.

The second port of the first asymmetric half-bridge sub-module is connected to the second port of the ninth asymmetric half-bridge sub-module.

The second port of the sixth asymmetric half-bridge sub-module is connected to the second port of the eighth asymmetric half-bridge sub-module.

The first output terminal is the second port of the sixth asymmetric half-bridge sub-module. The second output terminal is the second port of the ninth asymmetric half-bridge sub-module.

As shown in FIG. 1a, the asymmetric half-bridge sub-module 101 includes at least two switches and at least one energy storage element. A first port of the first switch 111 is connected to one end of the energy storage element 113. The other end of the energy storage element 113 is connected to a second port of the second switch 112. A first port of the second switch 112 is connected to a second port of the first switch 111.

Optionally, the switches are selected from a group consisting of IGBT, MOSFET, SiC or GaN power switch devices.

Optionally, the energy storage element is selected from a group consisting of a capacitor, a super-capacitor, a lithium battery pack, a lead-acid storage battery pack, or a sodium-sulfur battery pack.

Embodiment 5

This Embodiment Provides a Method for Constructing a Fractal Converter.

The method for constructing the fractal converter includes:

replacing a switch and/or an energy storage element of a symmetric half-bridge sub-module with the same symmetric half-bridge sub-module for at least two times.

Figure 1B:
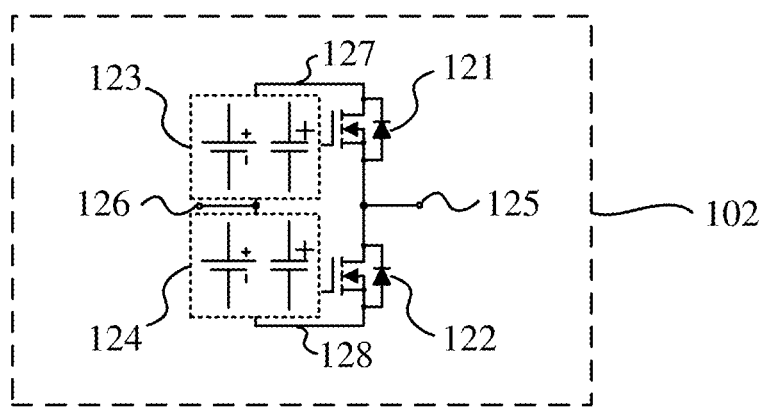
FIG. 1b is a structural diagram of a conventional symmetric half-bridge sub-module.

As shown in FIG. 1b, the symmetric half-bridge sub-module 102 includes: at least two switches 121, 122 and at least two energy storage elements 123, 124. A first port of the first switch 121 is connected to one end of the first energy storage element 123. The other end of the first energy storage element 123 is connected to one end of the second energy storage element 124. The other end of the second energy storage element 124 is connected to a second port of the second switch 122. A first port of the second switch 122 is connected to a second port of the first switch 121.

Optionally, the switches are selected from a group consisting of IGBT, MOSFET, SiC or GaN power switch devices.

Optionally, the energy storage elements are selected from a group consisting of a capacitor, a super-capacitor, a lithium battery pack, a lead-acid storage battery pack, or a sodium-sulfur battery pack.

Embodiment 6

This Embodiment Provides a Fractal Converter.

The fractal converter is a symmetric half-bridge switching fractal converter 202, which is constructed by replacing, using the method for constructing the fractal converter described in Embodiment 5, a switch of a symmetric half-bridge sub-module with a symmetric half-bridge sub-module for at least two times.

Figure 2B:
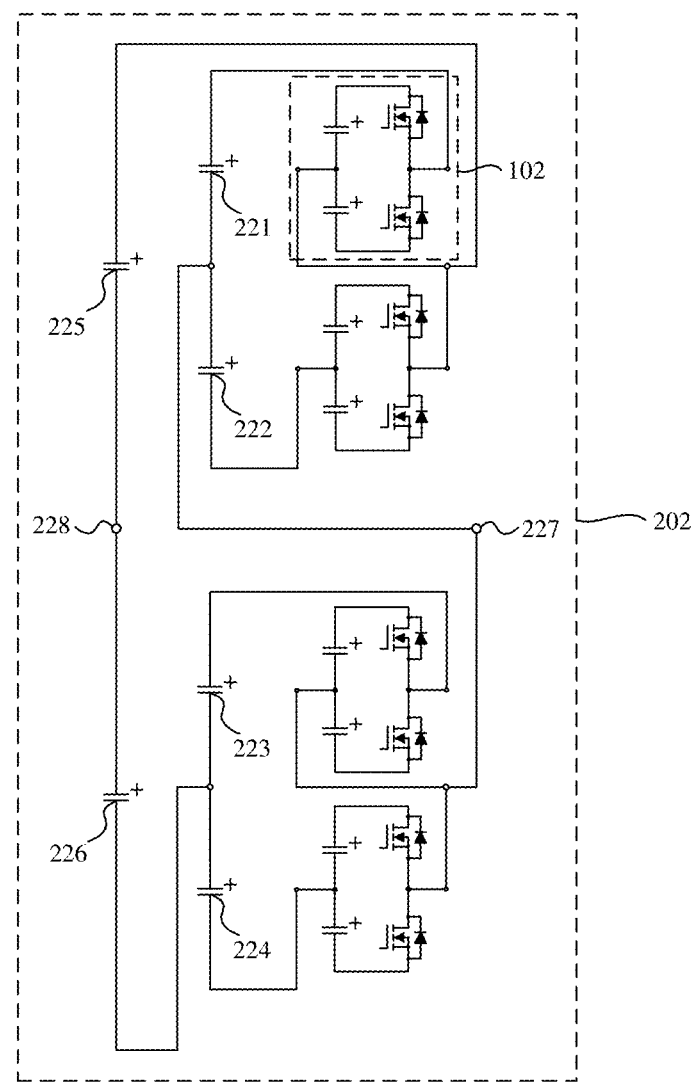
FIG. 2b is a structural diagram of a symmetric half-bridge switching fractal converter implemented by the present invention.

The fractal converter includes at least four symmetric half-bridge sub-modules 102, at least six energy storage elements 221, 222, 223, 224, 225, 226, and at least two output terminals 227, 228, as shown in FIG. 2b.

The first energy storage element 221 is arranged between a first port of the first symmetric half-bridge sub-module and a second port of the third symmetric half-bridge sub-module. The second energy storage element 222 is arranged between a second port of the second symmetric half-bridge sub-module and the second port of the third symmetric half-bridge sub-module. A first port of the second symmetric half-bridge sub-module is connected to a first port of the third symmetric half-bridge sub-module after being sequentially connected to the fifth energy storage element 225, the sixth energy storage element 226, and the third energy storage element 223. The first port of the third symmetric half-bridge sub-module is connected to a second port of the fourth symmetric half-bridge sub-module after being sequentially connected to the third energy storage element 223 and the fourth energy storage element 226. A second port of the first symmetric half-bridge sub-module is connected to a first port of the second symmetric half-bridge sub-module. The second port of the third symmetric half-bridge sub-module is connected to a first port of the fourth symmetric half-bridge sub-module.

The first output terminal 227 is the second port of the third symmetric half-bridge sub-module. The second output terminal 228 is arranged between the fifth energy storage element 225 and the sixth energy storage element 226.

As shown in FIG. 1b, the symmetric half-bridge sub-module 102 includes: at least two switches 121, 122 and at least two energy storage elements 123, 124. A first port of the first switch 121 is connected to one end of the first energy storage element 123. The other end of the first energy storage element 123 is connected to one end of the second energy storage element 124. The other end of the second energy storage element 124 is connected to a second port of the second switch 122. A first port of the second switch 122 is connected to a second port of the first switch 121.

Optionally, the switches are selected from a group consisting of IGBT, MOSFET, SiC or GaN power switch devices.

Optionally, the energy storage elements are selected from a group consisting of a capacitor, a super-capacitor, a lithium battery pack, a lead-acid storage battery pack, or a sodium-sulfur battery pack.

Embodiment 7

This Embodiment Provides a Fractal Converter.

The fractal converter is a symmetric half-bridge energy storage fractal converter 302, which is constructed by replacing, using the method for constructing the fractal converter described in Embodiment 5, an energy storage element of a symmetric half-bridge sub-module with a symmetric half-bridge sub-module for at least two times.

Figure 3B:
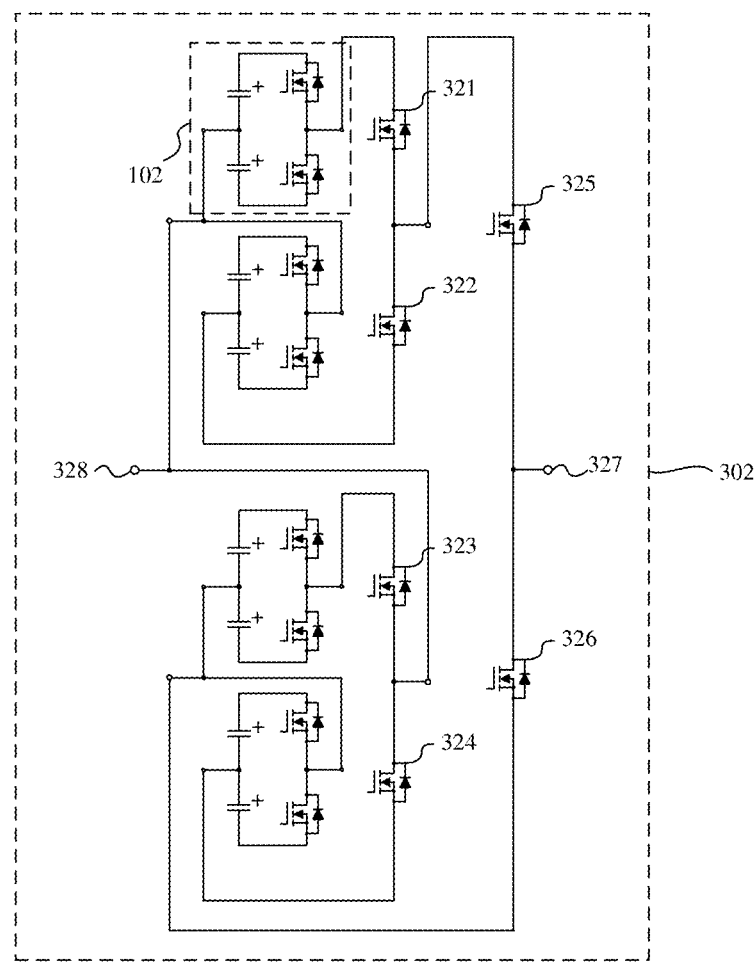
FIG. 3b is a structural diagram of a symmetric half-bridge energy storage fractal converter implemented by the present invention.

The fractal converter includes at least four symmetric half-bridge sub-modules 102, at least six switches 321, 322, 323, 324, 325, 326, and at least two output terminals 327, 328, as shown in FIG. 3b.

A second port of the first symmetric half-bridge sub-module is connected to a first port of the second symmetric half-bridge sub-module. A second port of the third symmetric half-bridge sub-module is connected to a first port of the fourth symmetric half-bridge sub-module.

A first port of the first symmetric half-bridge sub-module is connected to a first port of the first switch 321. A second port of the first switch 321 is connected to a first port of the second switch 322 and a first port of the fifth switch 325 respectively. A second port of the second switch 322 is connected to a second port of the second symmetric half-bridge sub-module. A second port of the fifth switch 325 is connected to a first port of the sixth switch 326. A second port of the sixth switch 326 is connected to a first port of the fourth symmetric half-bridge sub-module. A first port of the third switch 323 is connected to a first port of the third symmetric half-bridge sub-module. A second port of the third switch 323 is connected to a first port of the fourth switch 324. A second port of the fourth switch 324 is connected to a second port of the fourth symmetric half-bridge sub-module. A second port of the first symmetric half-bridge sub-module is connected to the second port of the third switch 323.

The first output terminal 327 is a second port of a fifth energy storage element. The second output terminal 328 is the second port of the first symmetric half-bridge sub-module.

As shown in FIG. 1b, the symmetric half-bridge sub-module 102 includes: at least two switches 121, 122 and at least two energy storage elements 123, 124. A first port of the first switch 121 is connected to one end of the first energy storage element 123. The other end of the first energy storage element 123 is connected to one end of the second energy storage element 124. The other end of the second energy storage element 124 is connected to a second port of the second switch 122. A first port of the second switch 122 is connected to a second port of the first switch 121.

Optionally, the switches are selected from a group consisting of IGBT, MOSFET, SiC or GaN power switch devices.

Optionally, the energy storage elements are selected from a group consisting of a capacitor, a super-capacitor, a lithium battery pack, a lead-acid storage battery pack, or a sodium-sulfur battery pack.

Embodiment 8

This Embodiment Provides a Fractal Converter.

The fractal converter is a symmetric half-bridge switching and energy storage fractal converter 402, which is constructed by replacing, using the method for constructing the fractal converter described in Embodiment 5, a switch and an energy storage element of a symmetric half-bridge sub-module with a symmetric half-bridge sub-module for at least two times.

Figure 4B:
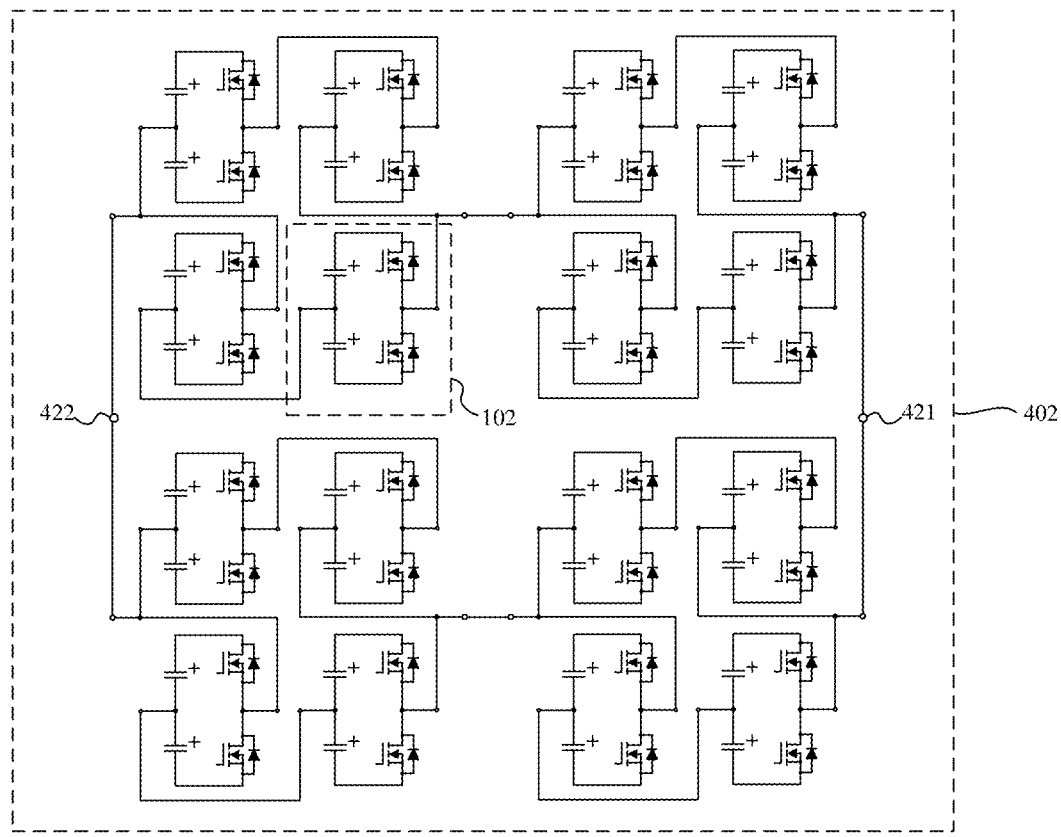
FIG. 4b is a structural diagram of a symmetric half-bridge switching and energy storage fractal converter implemented by the present invention.

The fractal converter includes at least sixteen symmetric half-bridge sub-modules 102 and at least two output terminals 421, 422, as shown in FIG. 4b.

A first port of the first symmetric half-bridge sub-module is connected to a first port of the second symmetric half-bridge sub-module. A second port of the second symmetric half-bridge sub-module is connected to a first port of the fourth symmetric half-bridge sub-module. A second port of the fourth symmetric half-bridge sub-module is connected to a second port of the third symmetric half-bridge sub-module. A first port of the third symmetric half-bridge sub-module is connected to a second port of the first symmetric half-bridge sub-module.

A first port of the fifth symmetric half-bridge sub-module is connected to a first port of the sixth symmetric half-bridge sub-module. A second port of the sixth symmetric half-bridge sub-module is connected to a first port of the eighth symmetric half-bridge sub-module. A second port of the eighth symmetric half-bridge sub-module is connected to a second port of the seventh symmetric half-bridge sub-module. A first port of the seventh symmetric half-bridge sub-module is connected to the second port of the sixth symmetric half-bridge sub-module.

A first port of the ninth symmetric half-bridge sub-module is connected to a first port of the tenth symmetric half-bridge sub-module. A second port of the tenth symmetric half-bridge sub-module is connected to a first port of the twelfth symmetric half-bridge sub-module. A second port of the twelfth symmetric half-bridge sub-module is connected to a second port of the eleventh symmetric half-bridge sub-module. A first port of the eleventh symmetric half-bridge sub-module is connected to a second port of the tenth symmetric half-bridge sub-module.

A first port of the thirteenth symmetric half-bridge sub-module is connected to a first port of the fourteenth symmetric half-bridge sub-module. A second port of the fourteenth symmetric half-bridge sub-module is connected to a first port of the sixteenth symmetric half-bridge sub-module. A second port of the sixteenth symmetric half-bridge sub-module is connected to a second port of the fifteenth symmetric half-bridge sub-module. A first port of the fifteenth symmetric half-bridge sub-module is connected to a second port of the fourteenth symmetric half-bridge sub-module.

The second port of the first symmetric half-bridge sub-module is connected to a second port of the ninth symmetric half-bridge sub-module. The second port of the second symmetric half-bridge sub-module is connected to a second port of the fifth symmetric half-bridge sub-module. The second port of the sixth symmetric half-bridge sub-module is connected to the second port of the fourteenth symmetric half-bridge sub-module. The second port of the tenth symmetric half-bridge sub-module is connected to a second port of the thirteenth symmetric half-bridge sub-module.

The first output terminal 421 is the second port of the sixth symmetric half-bridge sub-module. The second output terminal 422 is the second port of the first symmetric half-bridge sub-module.

As shown in FIG. 1b, the symmetric half-bridge sub-module 102 includes: at least two switches 121, 122 and at least two energy storage elements 123, 124. A first port of the first switch 121 is connected to one end of the first energy storage element 123. The other end of the first energy storage element 123 is connected to one end of the second energy storage element 124. The other end of the second energy storage element 124 is connected to a second port of the second switch 122. A first port of the second switch 122 is connected to a second port of the first switch 121.

Optionally, the switches are selected from a group consisting of IGBT, MOSFET, SiC or GaN power switch devices.

Optionally, the energy storage elements are selected from a group consisting of a capacitor, a super-capacitor, a lithium battery pack, a lead-acid storage battery pack, or a sodium-sulfur battery pack.

Embodiment 9

This Embodiment Provides a Method for Constructing a Fractal Converter.

The method for constructing the fractal converter includes:

replacing a switch and/or an energy storage element of an H-bridge sub-module with the same H-bridge sub-module for at least two times.

Figure 1C:
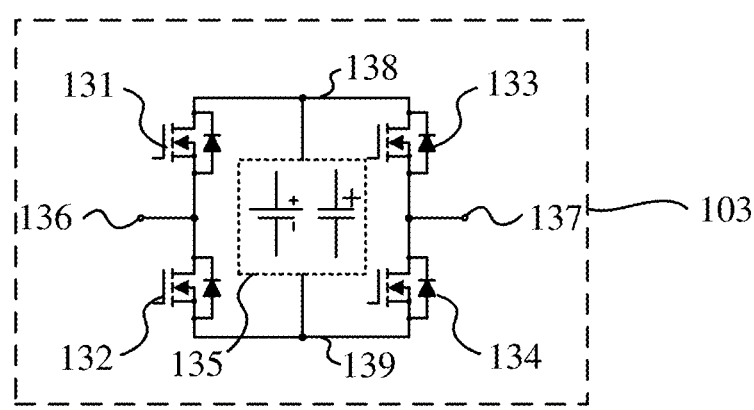
FIG. 1c is a structural diagram of a conventional H-bridge sub-module.

As shown in FIG. 1c, the H-bridge sub-module 103 includes: at least four switches 131, 132, 133, 134, and at least one energy storage element 135, which are connected into an H-bridge structure. A first port of the first switch 131 is connected to a first port of the third switch 133 and one end of the energy storage element 135 respectively. A second port of the third switch 133 is connected to a first port of the fourth switch 134. A second port of the fourth switch 134 is connected to the other end of the energy storage element 135 and a second port of the second switch 132 respectively. A first port of the second switch 132 is connected to a second port of the first switch 131.

Optionally, the switches are selected from a group consisting of IGBT, MOSFET, SiC or GaN power switch devices.

Optionally, the energy storage element is selected from a group consisting of a capacitor, a super-capacitor, a lithium battery pack, a lead-acid storage battery pack, or a sodium-sulfur battery pack.

Embodiment 10

This Embodiment Provides a Fractal Converter.

The fractal converter is an H-bridge switching fractal converter 203, which is constructed by replacing, using the method for constructing the fractal converter described in Embodiment 9, a switch of an H-bridge sub-module with an H-bridge sub-module for at least two times.

Figure 2C:
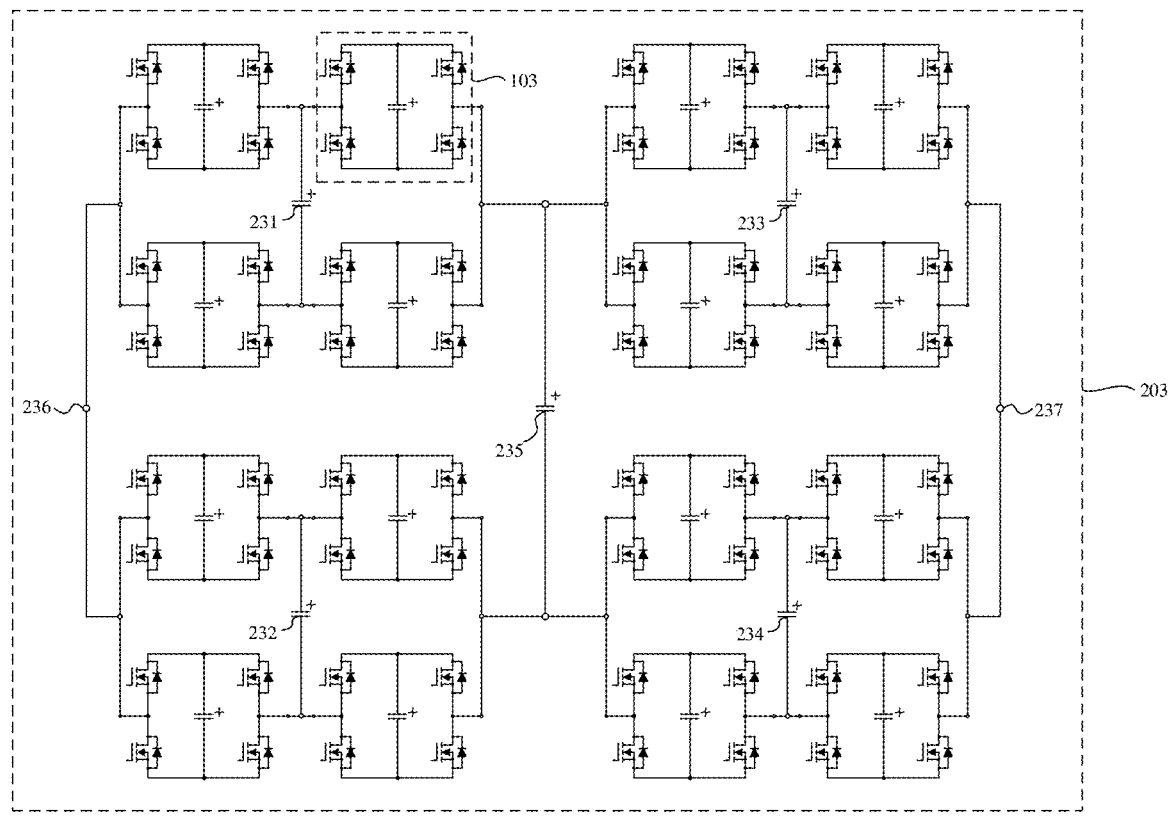
FIG. 2c is a structural diagram of an H-bridge switching fractal converter implemented by the present invention.

The fractal converter includes at least sixteen H-bridge sub-modules, at least five energy storage elements 231, 232, 233, 234, 235, and at least two output terminals 235, 236, as shown in FIG. 2c.

A first port of the first H-bridge sub-module is connected to a second port of the second H-bridge sub-module. A first port of the second H-bridge sub-module is connected to a first port of the fourth H-bridge sub-module. A second port of the fourth H-bridge sub-module is connected to a first port of the third H-bridge sub-module. A second port of the third H-bridge sub-module is connected to a second port of the first H-bridge sub-module. The first energy storage element 231 is arranged between the first port of the first H-bridge sub-module and the second port of the fourth H-bridge sub-module.

A first port of the fifth H-bridge sub-module is connected to a second port of the sixth H-bridge sub-module. A first port of the sixth H-bridge sub-module is connected to a first port of the eighth H-bridge sub-module. A second port of the eighth H-bridge sub-module is connected to a first port of the seventh H-bridge sub-module. A second port of the seventh H-bridge sub-module is connected to a second port of the fifth H-bridge sub-module. The second energy storage element 232 is arranged between the first port of the fifth H-bridge sub-module and the second port of the eighth H-bridge sub-module.

A first port of the ninth H-bridge sub-module is connected to a second port of the tenth H-bridge sub-module. A first port of the tenth H-bridge sub-module is connected to a first port of the twelfth H-bridge sub-module. A second port of the twelfth H-bridge sub-module is connected to a first port of the eleventh H-bridge sub-module. A second port of the eleventh H-bridge sub-module is connected to a second port of the ninth H-bridge sub-module. The third energy storage element 233 is arranged between the first port of the ninth H-bridge sub-module and the second port of the twelfth H-bridge sub-module.

A first port of the thirteenth H-bridge sub-module is connected to a second port of the fourteenth H-bridge sub-module. A first port of the fourteenth H-bridge sub-module is connected to a first port of the sixteenth H-bridge sub-module. A second port of the sixteenth H-bridge sub-module is connected to a first port of the fifteenth H-bridge sub-module. A second port of the fifteenth H-bridge sub-module is connected to a second port of the thirteenth H-bridge sub-module. The fourth energy storage element 234 is arranged between the first port of the thirteenth H-bridge sub-module and the second port of the sixteenth H-bridge sub-module.

The second port of the first H-bridge sub-module is connected to the second port of the fifth H-bridge sub-module. The first port of the second H-bridge sub-module is connected to the second port of the ninth H-bridge sub-module. The first port of the sixth H-bridge sub-module is connected to the second port of the thirteenth H-bridge sub-module. The first port of the tenth H-bridge sub-module is connected to the first port of the fourteenth H-bridge sub-module.

The fifth energy storage element 235 is arranged between the first port of the second H-bridge sub-module and the second port of the fifteenth H-bridge sub-module.

The first output terminal 236 is the second port of the first H-bridge sub-module. The second output terminal 237 is the first port of the tenth H-bridge sub-module.

As shown in FIG. 1c, the H-bridge sub-module 103 includes: at least four switches 131, 132, 133, 134, and at least one energy storage element 135, which are connected into an H-bridge structure. A first port of the first switch 131 is connected to a first port of the third switch 133 and one end of the energy storage element 135 respectively. A second port of the third switch 133 is connected to a first port of the fourth switch 134. A second port of the fourth switch 134 is connected to the other end of the energy storage element 135 and a second port of the second switch 132 respectively. A first port of the second switch 132 is connected to a second port of the first switch 131.

Optionally, the switches are selected from a group consisting of IGBT, MOSFET, SiC or GaN power switch devices.

Optionally, the energy storage element is selected from a group consisting of a capacitor, a super-capacitor, a lithium battery pack, a lead-acid storage battery pack, or a sodium-sulfur battery pack.

Embodiment 11

This Embodiment Provides a Fractal Converter.

The fractal converter is an H-bridge energy storage fractal converter 303, which is constructed by replacing, using the method for constructing the fractal converter described in Embodiment 9, an energy storage element of an H-bridge sub-module with an H-bridge sub-module for at least two times.

Figure 3C:
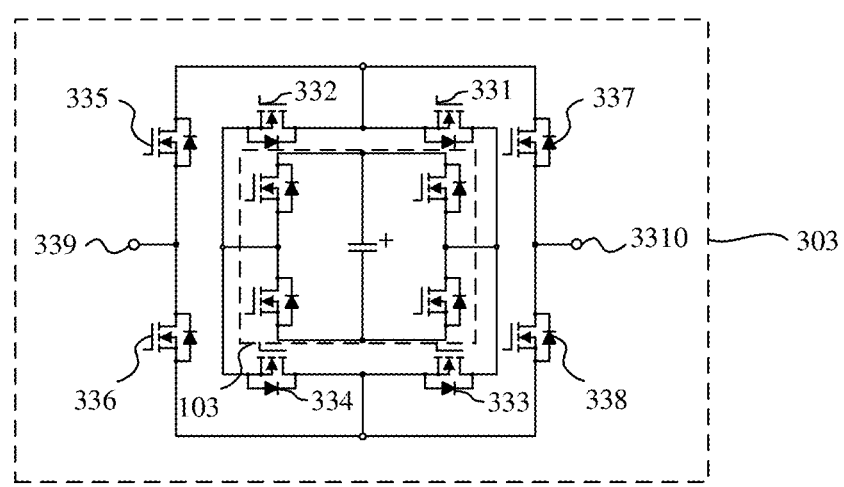
FIG. 3c is a structural diagram of an H-bridge energy storage fractal converter implemented by the present invention.

The fractal converter includes at least one H-bridge sub-module, at least eight switches 331, 332, 333, 334, 335, 336, 337, 338, and at least two output terminals 339, 3310, as shown in FIG. 3c.

A first port of the first switch 331 is connected to a first port of the third switch 333. A second port of the third switch 333 is connected to a first port of the fourth switch 334. A second port of the fourth switch 334 is connected to a second port of the second switch 332. A first port of the second switch 332 is connected to a second port of the first switch 331.

A first port of the H-bridge sub-module is connected to the first port of the first switch 331. A second port of the H-bridge sub-module is connected to the second port of the fourth switch 334.

A first port of the fifth switch 335 is connected to a first port of the seventh switch 337. A second port of the seventh switch 337 is connected to a first port of the eighth switch 338. A second port of the eighth switch 338 is connected to a second port of the sixth switch 336. A first port of the sixth switch 336 is connected to a second port of the fifth switch 335.

The first port of the fifth switch 335 is connected to the second port of the first switch 331. The first port of the fourth switch 334 is connected to the second port of the eighth switch 338.

The first output terminal 339 is the second port of the fifth switch 335. The second output terminal 3310 is the second port of the seventh switch 337.

As shown in FIG. 1c, the H-bridge sub-module 103 includes: at least four switches 131, 132, 133, 134, and at least one energy storage element 135, which are connected into an H-bridge structure. A first port of the first switch 131 is connected to a first port of the third switch 133 and one end of the energy storage element 135 respectively. A second port of the third switch 133 is connected to a first port of the fourth switch 134. A second port of the fourth switch 134 is connected to the other end of the energy storage element 135 and a second port of the second switch 132 respectively. A first port of the second switch 132 is connected to a second port of the first switch 131.

Optionally, the switches are selected from a group consisting of IGBT, MOSFET, SiC or GaN power switch devices.

Optionally, the energy storage element is selected from a group consisting of a capacitor, a super-capacitor, a lithium battery pack, a lead-acid storage battery pack, or a sodium-sulfur battery pack.

Embodiment 12

This Embodiment Provides a Fractal Converter.

The fractal converter is an H-bridge switching and energy storage fractal converter 403, which is constructed by replacing, using the method for constructing the fractal converter described in Embodiment 9, a switch and an energy storage element of an H-bridge sub-module with an H-bridge sub-module for at least two times.

Figure 4C:
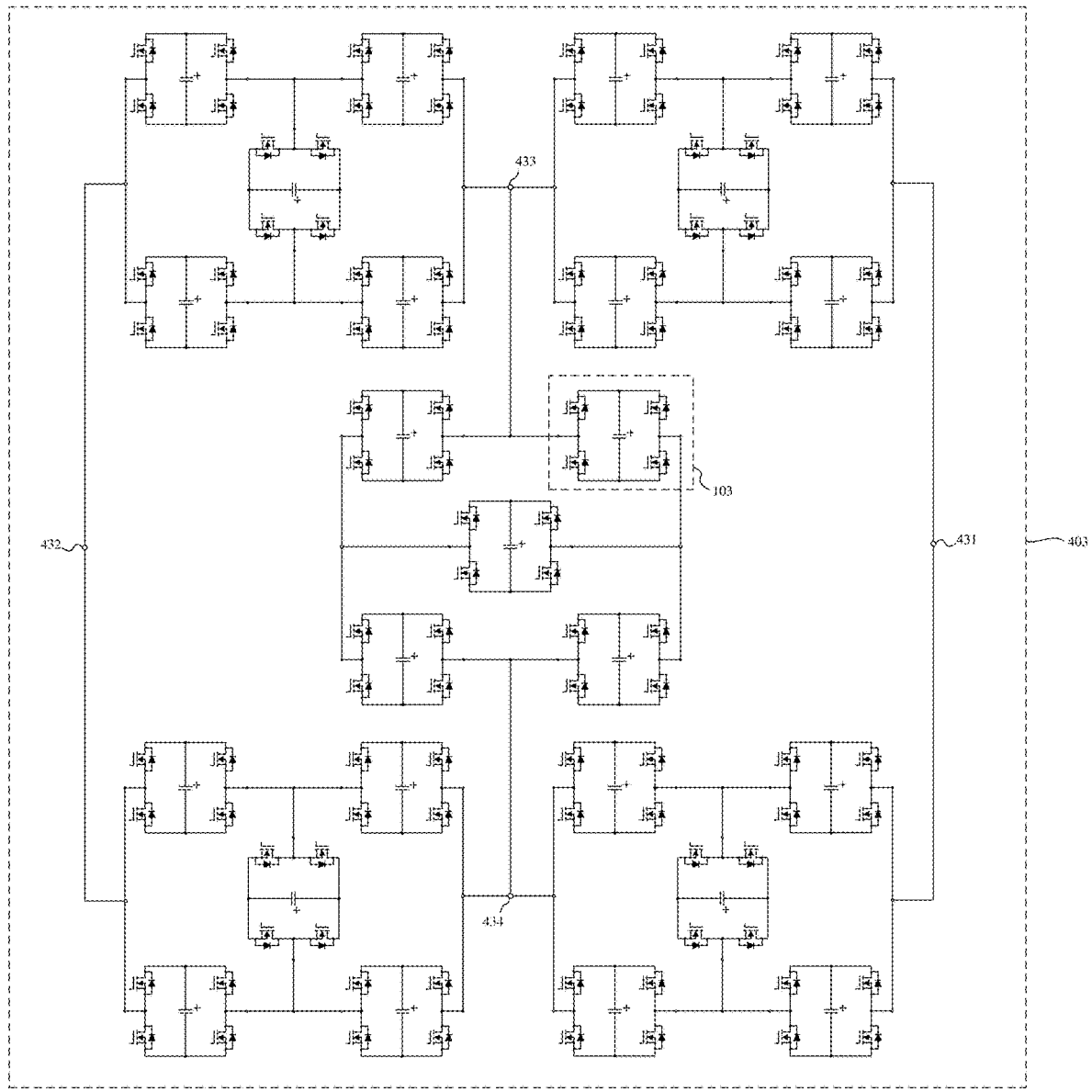
FIG. 4c is a structural diagram of an H-bridge switching and energy storage fractal converter implemented by the present invention.

The fractal converter includes at least twenty-five H-bridge sub-modules and at least four output terminals 431, 432, 433, 434, as shown in FIG. 4c.

A first port of the first H-bridge sub-module is connected to a second port of the second H-bridge sub-module and a first port of the third H-bridge sub-module respectively. A first port of the second H-bridge sub-module is connected to a first port of the fifth H-bridge sub-module. A second port of the fifth H-bridge sub-module is connected to a second port of the third H-bridge sub-module and a first port of the fourth H-bridge sub-module respectively. A second port of the fourth H-bridge sub-module is connected to a second port of the first H-bridge sub-module.

A first port of the sixth H-bridge sub-module is connected to a second port of the seventh H-bridge sub-module and a first port of the eighth H-bridge sub-module respectively. A first port of the seventh H-bridge sub-module is connected to a first port of the tenth H-bridge sub-module. A second port of the tenth H-bridge sub-module is connected to a second port of the eighth H-bridge sub-module and a first port of the ninth H-bridge sub-module respectively. A second port of the ninth H-bridge sub-module is connected to a second port of the sixth H-bridge sub-module.

A first port of the eleventh H-bridge sub-module is connected to a second port of the twelfth H-bridge sub-module and a first port of the thirteenth H-bridge sub-module respectively. A first port of the twelfth H-bridge sub-module is connected to a first port of the fifteenth H-bridge sub-module. A second port of the fifteenth H-bridge sub-module is connected to a second port of the thirteenth H-bridge sub-module and a first port of the fourteenth H-bridge sub-module respectively. A second port of the fourteenth H-bridge sub-module is connected to a second port of the eleventh H-bridge sub-module.

A first port of the sixteenth H-bridge sub-module is connected to a second port of the seventeenth H-bridge sub-module and a first port of the eighteenth H-bridge sub-module respectively. A first port of the seventeenth H-bridge sub-module is connected to a first port of the twentieth H-bridge sub-module. A second port of the twentieth H-bridge sub-module is connected to a second port of the eighteenth H-bridge sub-module and a first port of the nineteenth H-bridge sub-module respectively. A second port of the nineteenth H-bridge sub-module is connected to a second port of the sixteenth H-bridge sub-module.

A first port of the twenty-first H-bridge sub-module is connected to a second port of the twenty-second H-bridge sub-module and a first port of the twenty-third H-bridge sub-module respectively. A first port of the twenty-second H-bridge sub-module is connected to a first port of the twenty-fifth H-bridge sub-module. A second port of the twenty-fifth H-bridge sub-module is connected to a second port of the twenty-third H-bridge sub-module and a first port of the twenty-fourth H-bridge sub-module respectively. A second port of the twenty-fourth H-bridge sub-module is connected to a second port of the twenty-first H-bridge sub-module.

The second port of the first H-bridge sub-module is connected to the second port of the sixteenth H-bridge sub-module. The first port of the second H-bridge sub-module is connected to the second port of the twelfth H-bridge sub-module. The first port of the fourteenth H-bridge sub-module is connected to the second port of the twenty-fourth H-bridge sub-module. The first port of the seventh H-bridge sub-module is connected to the first port of the twenty-fifth H-bridge sub-module.

The first output terminal 431 is the first port of the seventh H-bridge sub-module. The second output terminal 432 is the second port of the first H-bridge sub-module. The third output terminal 433 is the first port of the second H-bridge sub-module. The fourth output terminal 434 is the first port of the seventeenth H-bridge sub-module.

As shown in FIG. 1c, the H-bridge sub-module 103 includes: at least four switches 131, 132, 133, 134, and at least one energy storage element 135, which are connected into an H-bridge structure. A first port of the first switch 131 is connected to a first port of the third switch 133 and one end of the energy storage element 135 respectively. A second port of the third switch 133 is connected to a first port of the fourth switch 134. A second port of the fourth switch 134 is connected to the other end of the energy storage element 135 and a second port of the second switch 132 respectively. A first port of the second switch 132 is connected to a second port of the first switch 131.

Optionally, the switches are selected from a group consisting of IGBT, MOSFET, SiC or GaN power switch devices.

Optionally, the energy storage element is selected from a group consisting of a capacitor, a super-capacitor, a lithium battery pack, a lead-acid storage battery pack, or a sodium-sulfur battery pack.

Optionally, the switches (111, 112, 121, 122, 131, 132, 133, 134, 311, 312, 313, 314, 321, 322, 323, 324, 325, 326, 331, 332, 333, 334, 335, 336, 337, 338) are selected from a group consisting of IGBT, MOSFET, SiC or GaN power switch devices.

Optionally, the energy storage elements (113, 123, 124, 135, 211, 212, 213, 221, 222, 223, 224, 225, 226, 231, 232, 233, 234, 235) are selected from a group consisting of a capacitor, a super-capacitor, a lithium battery pack, a lead-acid storage battery pack, or a sodium-sulfur battery pack.

Embodiment 13

This Embodiment Provides a Fractal Converter.

Figure 5:
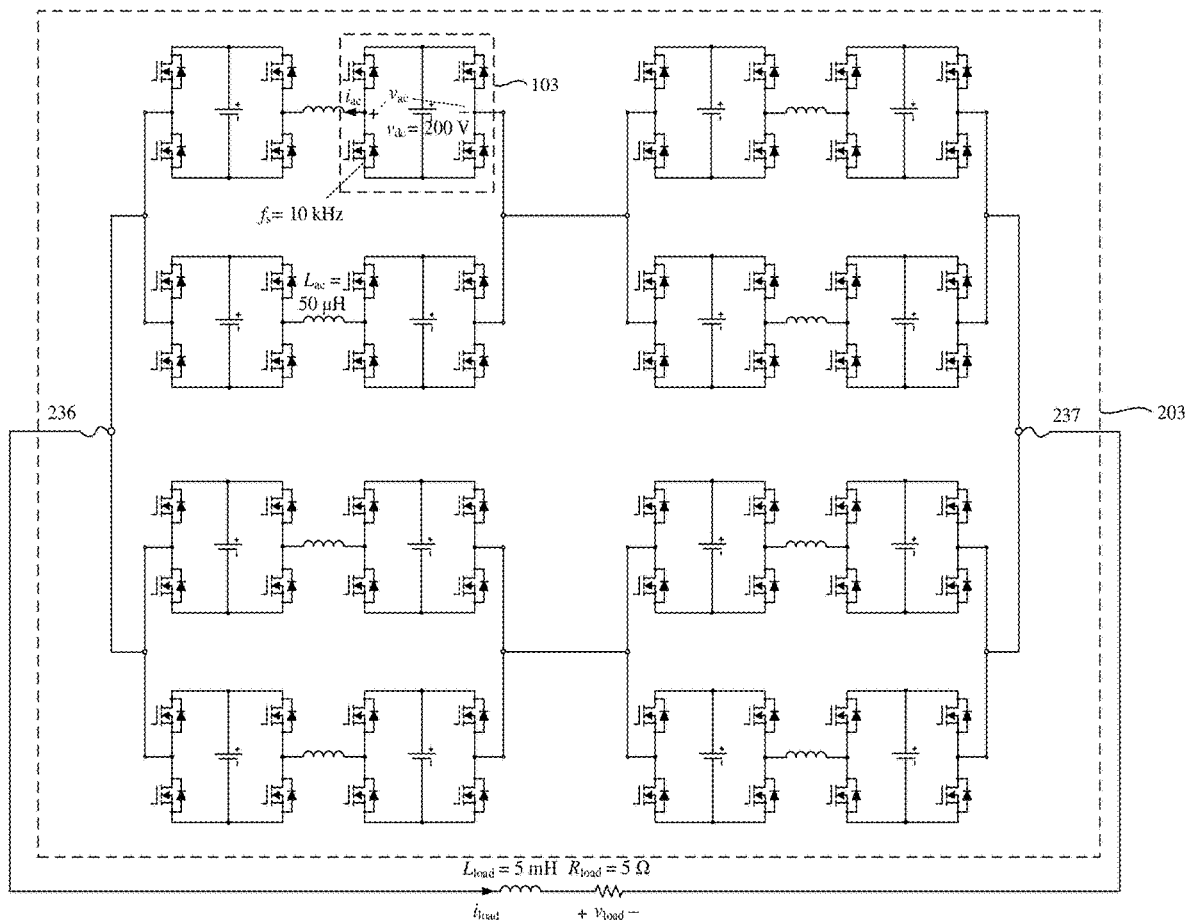
FIG. 5 is a schematic diagram of an H-bridge switching fractal converter implemented by the present invention to realize a high-voltage, large-current and high-power inverter system.

The fractal converter is a simplified solution for an H-bridge switching fractal converter 203 to realize a high-voltage, large-current and high-power inverter (as shown in FIG. 5). Specifically, the energy storage elements 231, 232, 233, 234, 235 in the H-bridge switching fractal converter 203 are removed on the basis of FIG. 2c.

A small sub-module filter inductance is added between the first port of the first H-bridge sub-module and the second port of the second H-bridge sub-module. A small sub-module filter inductance is added between the first port of the third H-bridge sub-module and the second port of the fourth H-bridge sub-module. A small sub-module filter inductance is added between the first port of the fifth H-bridge sub-module and the second port of the sixth H-bridge sub-module. A small sub-module filter inductance is added between the first port of the seventh H-bridge sub-module and the second port of the eighth H-bridge sub-module. A small sub-module filter inductance is added between the first port of the ninth H-bridge sub-module and the second port of the tenth H-bridge sub-module. A small sub-module filter inductance is added between the first port of the eleventh H-bridge sub-module and the second port of the twelfth H-bridge sub-module. A small sub-module filter inductance is added between the first port of the thirteenth H-bridge sub-module and the second port of the fourteenth H-bridge sub-module. A small sub-module filter inductance is added between the first port of the fifteenth H-bridge sub-module and the second port of the sixteenth H-bridge sub-module.

Resistance and inductance loads $R_{load}$ and $L_{load}$ are connected between the second port of the first H-bridge sub-module and the first port of the tenth H-bridge sub-module.

The small sub-module filter inductance $L_{ac}$ is equal to 50 µH.

All sub-modules are modulated with the same SPWM.

Referring to FIG. 2a, FIG. 2b, and FIG. 2c, the three embodiments disclose three switching fractal converters, including an asymmetric half-bridge switching fractal converter 201, a symmetric half-bridge switching fractal converter 202, and an H-bridge switching fractal converter 203.

Referring to FIG. 3a, FIG. 3b, and FIG. 3c, the three embodiments disclose three energy storage fractal converters, including an asymmetric half-bridge energy storage fractal converter 301, a symmetric half-bridge energy storage fractal converter 302, and an H-bridge energy storage fractal converter 303.

Referring to FIG. 4a, FIG. 4b, and FIG. 4c, the three embodiments disclose three switching and energy storage fractal converters, including an asymmetric half-bridge switching and energy storage fractal converter 401, a symmetric half-bridge switching and energy storage fractal converter 402, and an H-bridge switching and energy storage fractal converter 403.

Referring to FIG. 5, this embodiment discloses a solution for an H-bridge switching fractal converter 203 to realize a high-voltage, large-current and high-power inverter. In the embodiment, the additional energy storage elements 231, 232, 233, 234, 235 are removed, and the small sub-module small filter inductance $L_{ac}$ of 50 µH is added. All sub-modules are modulated at a switching frequency of 10 kHz with the same modulation method. The output is connected to the resistance and inductance loads $R_{load}$ of 5Ω and $L_{load}$ of 5 mH.

Compared with a conventional high-voltage and large-current power converter, the fractal power converter may output a high-voltage and large-current waveform and also evenly distribute voltage and current among the modules. The control method is simple and easy to standardize. Multi-port parallel output is allowed.

The asymmetric half-bridge sub-module 101 has three operating modes, including a positive voltage output mode, a zero voltage output mode, and an open-circuit mode. The switch 111 or 112 is turned on in the positive voltage and zero voltage output modes respectively. All switches are turned off in the open-circuit mode. The voltages of the output ports 114 and 115 of the asymmetric half-bridge sub-module may be adjusted by controlling and changing the time ratio of different operating modes.

The symmetric half-bridge sub-module 102 has three operating modes, including a positive voltage output mode, a negative voltage output mode, and an open-circuit mode. The switch 121 or 122 is turned on in the positive voltage and negative voltage output modes respectively. All switches are turned off in the open-circuit mode. The voltages of the output ports 125 and 126 of the symmetric half-bridge sub-module may be adjusted by controlling and changing the time ratio of different operating modes.

The H-bridge sub-module 103 has four operating modes, including a positive voltage output mode, a negative voltage output mode, a zero voltage output mode, and an open-circuit mode. Two groups of diagonal switches 131, 134 or 132, 133 are turned on in the positive voltage and negative voltage output modes respectively. Two upper switches 131, 133 or two lower switches 132, 134 are turned on in the zero voltage output mode. All switches are turned off in the open-circuit mode. The voltages of the output ports 136 and 137 of the H-bridge sub-module may be adjusted by controlling and changing the time ratio of different operating modes.

Figure 6A:
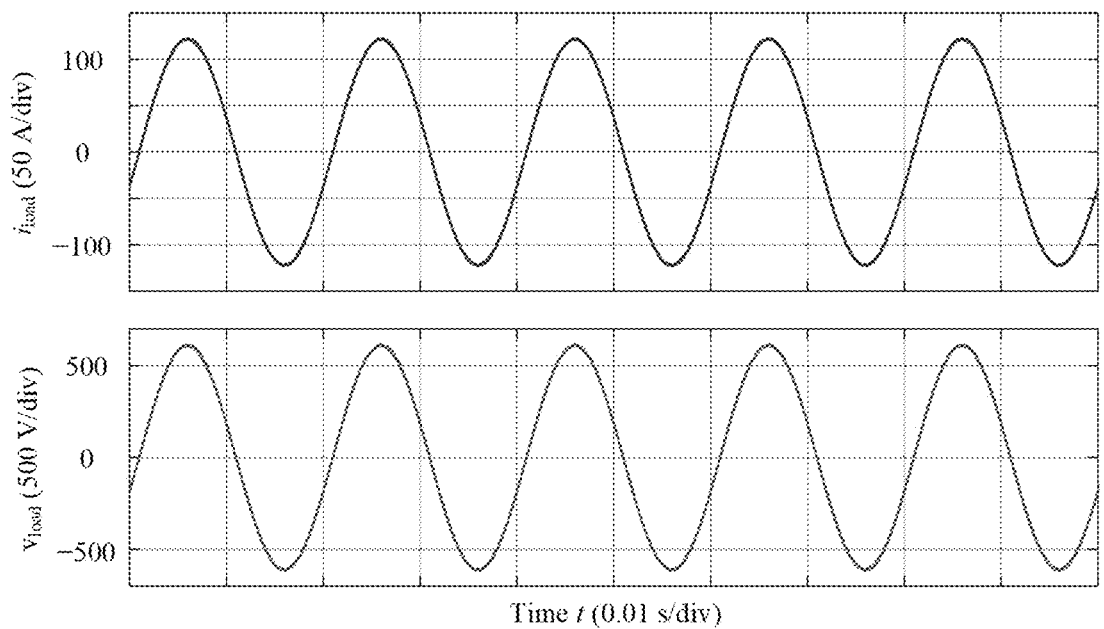
FIG. 6a is a simulation waveform diagram of load current $i_{load}$ and voltage $v_{load}$ of an H-bridge switching fractal converter implemented by the present invention.
Figure 6B:
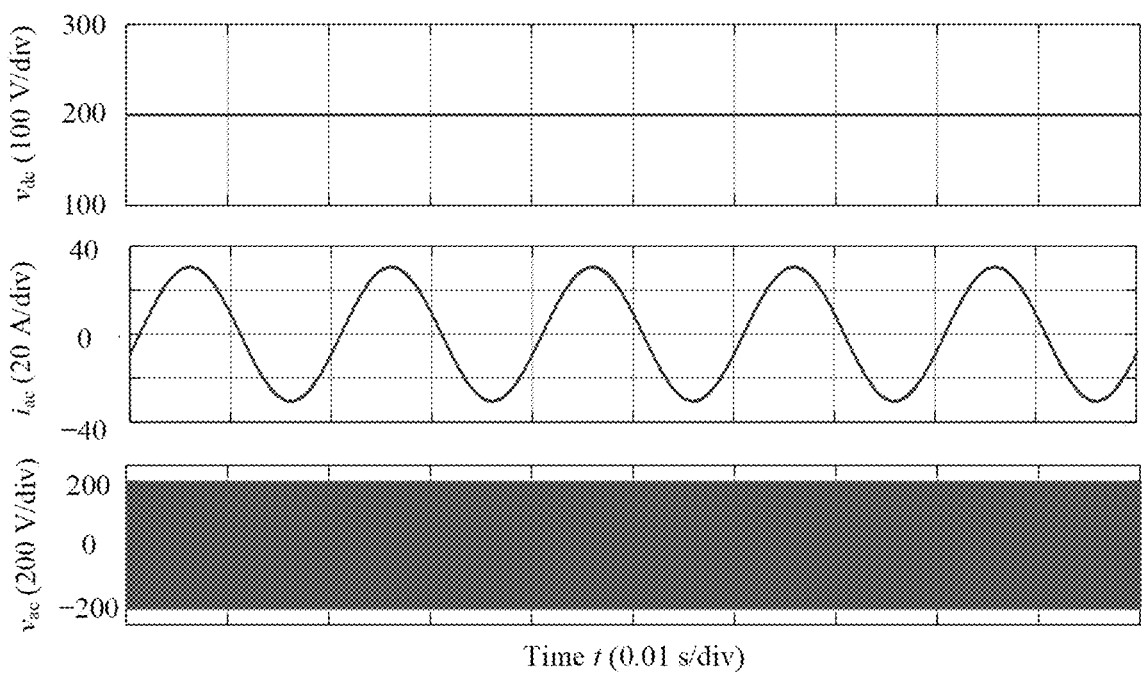
FIG. 6b is a simulation waveform diagram of a sub-module DC voltage $v_{dc}$, a sub-module AC current $i_{ac}$, and a sub-module AC voltage $v_{ac}$ of an H-bridge switching fractal converter implemented by the present invention.

FIG. 6a shows a simulation waveform diagram of load current $i_{load}$ and voltage $v_{load}$ of an H-bridge switching fractal converter. FIG. 6b shows a simulation waveform diagram of a sub-module DC voltage $v_{dc}$, a sub-module AC current $i_{ac}$, and a sub-module AC voltage $v_{ac}$ of an H-bridge switching fractal converter. As can be seen from the figures, all sub-modules may share the load voltage and current, and meet the load voltage, current and power requirements at the same time.

The present invention provides a method for constructing a fractal converter and nine fractal converters, which may be applied to large-power wind-solar storage renewable energy grid-connected power generation systems, high-voltage AC/DC transmission, medium-voltage electric drive, medium/high-voltage power quality purification devices, solid-state transformers, electric vehicle charging piles, power amplifiers, pulse plasma power supplies, special medical equipment power supplies, and electromagnetic gun power supplies, etc. Compared with a conventional high-voltage and large-current power converter, the fractal power converter may output any high-voltage and large-current waveform. The system is modularized, the structure is simple and extensible, and voltage and current may be evenly distributed among the modules. The control method is simple and easy to standardize. Multi-port parallel output is allowed.

The above descriptions are only preferred embodiments of the present invention and are not intended to limit the present invention. It will be apparent to those skilled in the art that various modifications and variations may be made in the present invention. Any modifications, equivalent substitutions, improvements, etc. made within the spirit and principles of the present invention are intended to be included within the scope of protection of the present invention.

What is claimed is:

1. A method for constructing a fractal converter, comprising:
   replacing a switch and/or an energy storage element of an H-bridge sub-module with the same H-bridge sub-module for at least two times, wherein an output of the H-bridge sub-module remains constant during replacing, wherein
   the fractal converter comprising at least twenty-five H-bridge sub-modules and at least four output terminals,
   wherein a first port of a first H-bridge sub-module is connected to a second port of a second H-bridge sub-module and a second port of a third H-bridge sub-module respectively, a first port of the second H-bridge sub-module is connected to a first port of a fifth H-bridge sub-module, a second port of the fifth H-bridge sub-module is connected to a first port of the third H-bridge sub-module and a first port of a fourth H-bridge sub-module respectively, and a second port of the fourth H-bridge sub-module is connected to a second port of the first H-bridge sub-module;

a first port of a sixth H-bridge sub-module is connected to a second port of a seventh H-bridge sub-module and a second port of an eighth H-bridge sub-module respectively, a first port of the seventh H-bridge sub-module is connected to a first port of a tenth H-bridge sub-module, a second port of the tenth H-bridge sub-module is connected to a first port of the eighth H-bridge sub-module and a first port of a ninth H-bridge sub-module respectively, and a second port of the ninth H-bridge sub-module is connected to a second port of the sixth H-bridge sub-module;

a first port of an eleventh H-bridge sub-module is connected to a second port of a twelfth H-bridge sub-module, a first port of the twelfth H-bridge sub-module is connected to a first port of a thirteenth H-bridge sub-module and a first port of a fifteenth H-bridge sub-module respectively, a second port of the fifteenth H-bridge sub-module is connected to a first port of a fourteenth H-bridge sub-module, and a second port of the fourteenth H-bridge sub-module is connected to a second port of the eleventh H-bridge sub-module and a second port of the thirteenth H-bridge sub-module respectively;

a first port of a sixteenth H-bridge sub-module is connected to a second port of a seventeenth H-bridge sub-module and a second port of an eighteenth H-bridge sub-module respectively, a first port of the seventeenth H-bridge sub-module is connected to a first port of a twentieth H-bridge sub-module, a second port of the twentieth H-bridge sub-module is connected to a first port of the eighteenth H-bridge sub-module and a first port of a nineteenth H-bridge sub-module respectively, and a second port of the nineteenth H-bridge sub-module is connected to a second port of the sixteenth H-bridge sub-module;

a first port of a twenty-first H-bridge sub-module is connected to a second port of a twenty-second H-bridge sub-module and a second port of a twenty-third H-bridge sub-module respectively, a first port of the twenty-second H-bridge sub-module is connected to a first port of a twenty-fifth H-bridge sub-module, a second port of the twenty-fifth H-bridge sub-module is connected to a first port of the twenty-third H-bridge sub-module and a first port of a twenty-fourth H-bridge sub-module respectively, and a second port of the twenty-fourth H-bridge sub-module is connected to a second port of the twenty-first H-bridge sub-module;

the second port of the first H-bridge sub-module is connected to the second port of the sixteenth H-bridge sub-module, the first port of the second H-bridge sub-module is connected to the second port of the twelfth H-bridge sub-module, the first port of the fourteenth H-bridge sub-module is connected to the second port of the twenty-fourth H-bridge sub-module, and the first port of the seventh H-bridge sub-module is connected to the first port of the twenty-fifth H-bridge sub-module; and a first output terminal is the first port of the seventh H-bridge sub-module, a second output terminal is the second port of the first H-bridge sub-module, a third output terminal is the first port of the second H-bridge sub-module, and a fourth output terminal is the first port of the seventeenth H-bridge sub-module.

2. The method for constructing the fractal converter according to claim 1, wherein switches of the at least twenty-five H-bridge sub-modules are selected from a group consisting of IGBT, MOSFET, SiC or GaN power switch devices.

3. The method for constructing the fractal converter according to claim 1, wherein the energy storage element is selected from a group consisting of a capacitor, a lithium battery pack, a lead-acid storage battery pack, or a sodium-sulfur battery pack.

4. A fractal converter, constructed by replacing a switch and/or an energy storage element of an H-bridge sub-module with the same H-bridge sub-module for at least two times, wherein an output of the H-bridge sub-module remains constant during replacing, wherein, the fractal converter comprising at least twenty-five H-bridge sub-modules and at least four output terminals, wherein a first port of a first H-bridge sub-module is connected to a second port of a second H-bridge sub-module and a second port of a third H-bridge sub-module respectively, a first port of the second H-bridge sub-module is connected to a first port of a fifth H-bridge sub-module, a second port of the fifth H-bridge sub-module is connected to a first port of the third H-bridge sub-module and a first port of a fourth H-bridge sub-module respectively, and a second port of the fourth H-bridge sub-module is connected to a second port of the first H-bridge sub-module;

a first port of a sixth H-bridge sub-module is connected to a second port of a seventh H-bridge sub-module and a second port of an eighth H-bridge sub-module respectively, a first port of the seventh H-bridge sub-module is connected to a first port of a tenth H-bridge sub-module, a second port of the tenth H-bridge sub-module is connected to a first port of the eighth H-bridge sub-module and a first port of a ninth H-bridge sub-module respectively, and a second port of the ninth H-bridge sub-module is connected to a second port of the sixth H-bridge sub-module;

a first port of an eleventh H-bridge sub-module is connected to a second port of a twelfth H-bridge sub-module, a first port of the twelfth H-bridge sub-module is connected to a first port of a thirteenth H-bridge sub-module and a first port of a fifteenth H-bridge sub-module respectively, a second port of the fifteenth H-bridge sub-module is connected to a first port of a fourteenth H-bridge sub-module, and a second port of the fourteenth H-bridge sub-module is connected to a second port of the eleventh H-bridge sub-module and a second port of the thirteenth H-bridge sub-module respectively;

a first port of a sixteenth H-bridge sub-module is connected to a second port of a seventeenth H-bridge sub-module and a second port of an eighteenth H-bridge sub-module respectively, a first port of the seventeenth H-bridge sub-module is connected to a first port of a twentieth H-bridge sub-module, a second port of the twentieth H-bridge sub-module is connected to a first port of the eighteenth H-bridge sub-module and a first port of a nineteenth H-bridge sub-module respectively, and a second port of the nineteenth H-bridge sub-module is connected to a second port of the sixteenth H-bridge sub-module;

a first port of a twenty-first H-bridge sub-module is connected to a second port of a twenty-second H-bridge sub-module and a second port of a twenty-third H-bridge sub-module respectively, a first port of the twenty-second H-bridge sub-module is connected to a first port of a twenty-fifth H-bridge sub-module, a second port of the twenty-fifth H-bridge sub-module is connected to a first port of the twenty-third H-bridge sub-module and a first port of a twenty-fourth H-bridge sub-module respectively, and a second port of the twenty-fourth H-bridge sub-module is connected to a second port of the twenty-first H-bridge sub-module;

the second port of the first H-bridge sub-module is connected to the second port of the sixteenth H-bridge sub-module, the first port of the second H-bridge sub-module is connected to the second port of the twelfth H-bridge sub-module, the first port of the fourteenth H-bridge sub-module is connected to the second port of the twenty-fourth H-bridge sub-module, and the first port of the seventh H-bridge sub-module is connected to the first port of the twenty-fifth H-bridge sub-module; and a first output terminal is the first port of the seventh H-bridge sub-module, a second output terminal is the second port of the first H-bridge sub-module, a third output terminal is the first port of the second H-bridge sub-module, and a fourth output terminal is the first port of the seventeenth H-bridge sub-module.

5. The fractal converter according to claim 4, wherein switches of the at least twenty-five H-bridge sub-modules are selected from a group consisting of IGBT, MOSFET, SiC or GaN power switch devices.

6. The fractal converter according to claim 4, wherein the energy storage element is selected from a group consisting of a capacitor, a lithium battery pack, a lead-acid storage battery pack, or a sodium-sulfur battery pack.

* * * * *